July 19, 1927.
W. BRAUNS ET AL
1,636,121
LOOP OR RING FASTENER FOR BAGS AND THE LIKE
Filed Aug. 20, 1921    2 Sheets-Sheet 1
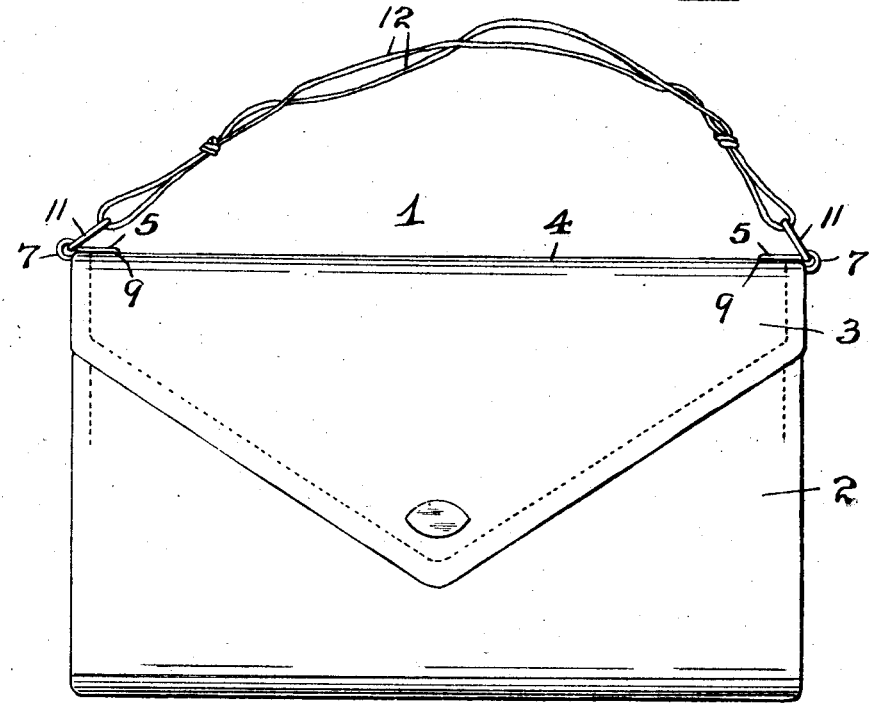

July 19, 1927.  1,636,121
W. BRAUNS ET AL
LOOP OR RING FASTENER FOR BAGS AND THE LIKE
Filed Aug. 20, 1921  2 Sheets-Sheet 2

INVENTORS:
William Brauns and
William J. Walker,
BY
Fraentzel and Richards,
ATTORNEYS.

Patented July 19, 1927.

1,636,121

UNITED STATES PATENT OFFICE.

WILLIAM BRAUNS AND WILLIAM J. WALKER, OF NEWARK, NEW JERSEY, ASSIGNORS TO ROSENBAND MFG. CO., INC., A CORPORATION OF NEW JERSEY.

LOOP OR RING FASTENER FOR BAGS AND THE LIKE.

Application filed August 20, 1921. Serial No. 493,978.

This invention has reference, generally, to improvements in fasteners for handles of ladies' hand-bags and pocket-books; and, the present invention relates, more particularly, to a novel and simply constructed handle-loop attaching means, comprising in connection with the usual ring or loop, a main loop-carrying plate provided with a pair of body-members, adapted to be brought into clamped relation with the opposite faces of the material of which the bag-body is made, and providing the same with securing means, other than the usual rivets, to thereby greatly reduce the cost of manufacture of the device, both as to construction and assembling of the same.

The present invention has for its principal objects to provide a cheap and simply constructed, as well as an efficient handle-loop attaching means, which has great strength and is readily secured in its operative position, without the use of independent fastening rivets to the bag-body.

Other objects of the present invention not at this time more particularly enumerated, will be clearly understood from the following detailed description of the present invention.

With the various objects of the present invention in view, the said invention consists, primarily, in the novel handle-loop fastener for bags hereinafter more fully set forth; and, the invention consists, furthermore, in the novel arrangements and combinations of the several devices and parts, as well as in the details of the construction of the said parts, all of which will be more fully described in the following specification, and then finally embodied in the clauses of the claims which are appended to and which form an essential part of the said specification.

The invention is illustrated in the accompanying drawings, in which:—

Figure 1 is a face view of a hand-bag or pocket-book, at the edge where the closing flap closes over the body of the bag or pocket-book, said view showing in connection therewith, the handle with its attaching rings or loops, and a pair of handle-loop fasteners attached to said edge, said fasteners illustrating one embodiment of the principles of the present invention; and Figure 2 is a top-edge view of the bag and plan view of the two loop-fasteners connected therewith.

Similar characters of reference are employed in all of the said above described views, to indicate corresponding parts.

Figure 3:
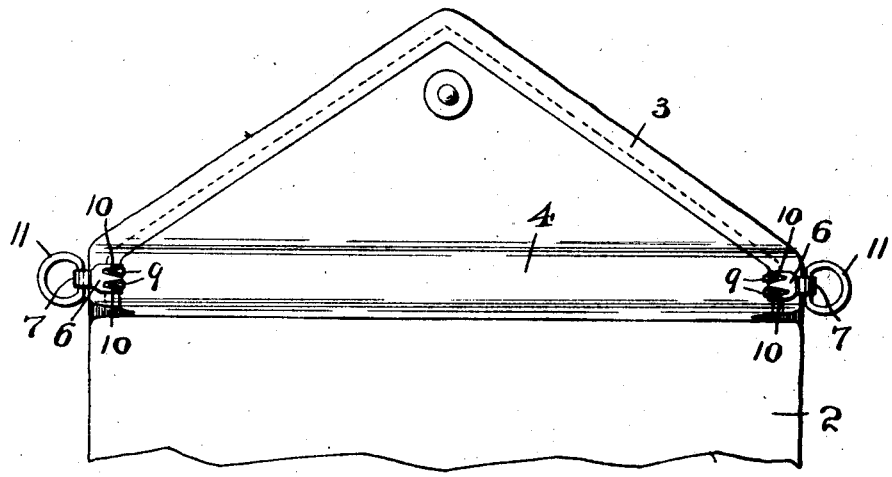
Figure 3 is a face view of the bag, with its closing flap represented in its opened relation to the body of the bag, said view illustrating in connection therewith, rear views of the loop-fasteners and the fastening means connected with the said devices.
Figure 4:
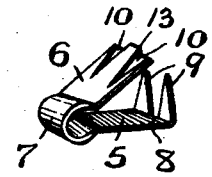
Figure 4 is a perspective view of one of said handle-loop fasteners.

Referring now to the several figures of the drawings, the reference-character 1 indicates a lady's hand-bag or pocket-book, the same comprising a usual bag-body 2 and a closing flap 3 joined to said body by means of the fold 4. Secured to said fold 4, preferably at the end-edges thereof, as shown in Figures 1, 2 and 3 of the drawings, are a pair of handle-loop fasteners, made according to and embodying the principles of the present invention. The form of handle-loop fastener shown in said figures, and in Figure 4 of the drawings is the preferred form of fastener, and the same consists, essentially, of a pair of plates or members 5 and 6, which are connected by means of a suitably bent connecting loop or eye, as 7. At its end-edge 8, the said plate 5 is provided with marginal prongs 9, projecting at an angle therefrom, and extending toward the plate 6. In its outer face the said plate 6 is made with corresponding prong-receiving depressions or pockets, as 10, for the purposes to be presently more fully set forth.

In applying the handle-loop fasteners to the edge-portions of the bag, as is shown in said Figures 1, 2 and 3 of the drawings, the rings or loops 11 of the handle 12 are first inserted over one of the said plates and arranged in the connecting loops or eyes 7, substantially as shown. The two plates or members are then arranged against the opposite face-portions of the fold 4, and the prongs 9 inserted into and through the material and then bent over the edge 13 of the plate 6 and into the depressions or pockets 10 in a manner as clearly shown in said Figure 3 of the drawings, so as to provide a perfectly smooth and unobstructed surface, as will be clearly understood.

Of course it will be understood, that while the loop-fasteners may be located and secured to the bag in the positions indicated in said Figures 1, 2 and 3 of the drawings, it will be clearly evident, that the loop-fasteners may be fastened in other locations upon the bag.

It will also be evident that the ring or loop-fasteners may be put to other purposes and uses.

Figure 5:
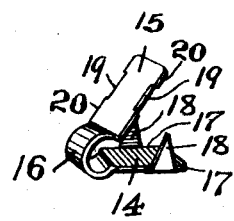
Figures 5, 6 and 7 are perspective views of modified forms of handle-loop fasteners, all made according to and embodying the principles of the present invention.

In Figure 5, we have shown a modified construction of loop-fastener, in which the reference-characters 14 and 15 indicate two plates or members, which are connected by means of a suitably bent connecting loop or eye, as 16. At the longitudinally extending marginal edges 17, the said plate 14 is made with fastening prongs 18 which extend toward the plate 15, and are adapted to be fitted in recessed or cut-away portions 19 in the longitudinally extending marginal edges 20 of said plate 15, for fastening and securing the loop-fasteners in position to the bag, as will be clearly understood.

Figure 6:
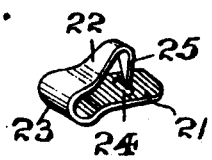

In the construction shown in Figure 6 of the drawings, the device consists of a pair of plates or members 21 and 22, suitably connected by means of an eye or loop-member 23. The member 21 is made with a laterally extending slot or opening, as 24, into which is to be inserted and adapted to be bent over against the said plate or member 21, a securing prong 25 which extends at an angle from the free end of the plate or member 22.

Figure 7:
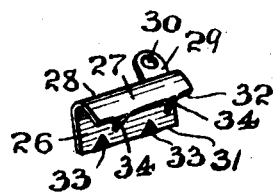

In Figure 7 of the drawings, is represented a pair of plates or members 26 and 27 which are connected by a suitably bent or curved connecting portion 28, from which extends, in suitable location and in an outward direction, an ear or lug 29 which is suitably perforated as at 30, to provide a suspension ring or loop. The longitudinally extending marginal edges 31 and 32 of the respective plates 26 and 27 are respectively provided with suitably disposed fastening or securing prongs, as 33 and 34.

The manner of attaching or securing the various above described ring or loop-fasteners to a bag, or other article, will be evident from an inspection of said Figures 5, 6 and 7, and any further description of the same is therefore deemed unnecessary.

We are aware, also, that other changes may be made in the general arrangements and combinations of the several devices and parts, as well as in the details of the construction of the same, without departing from the scope of the present invention, as set forth in the foregoing specification, and as defined in the clauses of the claims which are appended to the said specification. Hence, we do not limit our present invention to the exact arrangements and combinations of the various devices and parts, as defined in the foregoing specification, nor do we confine ourselves to the exact details of the construction of the said parts, as illustrated in the accompanying drawings.

We claim:—

1. A loop or ring-fastener comprising a pair of plate-members, a ring or loop-receiving element connected with said plate-members, and marginal fastening prongs connected with and extending from one of said plate-members, said prongs being adapted to be bent over the other plate-like member and brought in securing engagement with the other plate-member for securing the loop or ring-fastener to an article, said latter plate-member being provided with prong-receiving depressions for the reception of said prongs in said receiving depressions, to thereby provide a flush upper surface of the fastener.

2. A loop or ring-fastener for hand bags and pocket books, comprising a pair of plate-members doubled upon themselves so as to form a ring or loop-receiving element at one end of the fastener, one of the members of the said fastener being provided at the end opposite said ring or loop-receiving element with marginally disposed angular prongs to be bent over the other plate-like member, said latter member being provided at its end opposite from said ring or loop-receiving element with depressions for the reception of said prongs when attached to the hand bag or pocket book to thereby provide a flush upper surface of the fastener.

In testimony, that we claim the invention set forth above we have hereunto set our hands this 19th day of August, 1921.

WILLIAM BRAUNS.
WILLIAM J. WALKER.